United States Patent [19]
Beugelsdyk et al.

[11] Patent Number: 6,023,993
[45] Date of Patent: Feb. 15, 2000

[54] CONDUIT GUIDE FITTING

[75] Inventors: Anthony F. Beugelsdyk; Michael A. Barnard; Marvin L. Cox, all of Wichita, Kans.

[73] Assignee: Wescon Products Company, Wichita, Kans.

[21] Appl. No.: 08/968,713

[22] Filed: Nov. 12, 1997

[51] Int. Cl.$^7$ ..................................................... F16C 1/10
[52] U.S. Cl. ............................................ 74/502.6; 248/73
[58] Field of Search ................................ 74/502.4, 502.6; 403/353; 248/65, 71, 73

[56] References Cited

U.S. PATENT DOCUMENTS

| | | | |
|---|---|---|---|
| 1,140,940 | 5/1915 | Bales | 403/353 |
| 1,296,042 | 3/1919 | Bralove . | |
| 2,200,047 | 5/1940 | Tinnerman | 248/71 |
| 3,389,613 | 6/1968 | Turnbull | 403/353 |
| 3,995,512 | 12/1976 | Johnsen | 74/502.4 |
| 4,011,770 | 3/1977 | Webb | 74/502.4 |
| 4,647,241 | 3/1987 | Weber . | |
| 5,172,878 | 12/1992 | Lederman . | |
| 5,230,257 | 7/1993 | Nowak . | |
| 5,291,910 | 3/1994 | Bui et al. . | |
| 5,350,250 | 9/1994 | Nagler | 403/353 |
| 5,522,276 | 6/1996 | Lichtenberg | 74/502.6 |
| 5,553,822 | 9/1996 | Barnard et al. . | |
| 5,570,611 | 11/1996 | Pospisil et al. . | |
| 5,577,415 | 11/1996 | Reasoner . | |
| 5,579,662 | 12/1996 | Reasoner . | |
| 5,582,074 | 12/1996 | Kelley et al. | 74/502.4 |
| 5,605,074 | 2/1997 | Hall et al. . | |
| 5,615,583 | 4/1997 | Cunningham et al. . | |
| 5,632,182 | 5/1997 | Reasoner . | |
| 5,634,379 | 6/1997 | Barnard . | |

FOREIGN PATENT DOCUMENTS 905487  9/1962  United Kingdom ................... 74/502.4

OTHER PUBLICATIONS

Wescon Products Company binder—1978 (9pgs).

*Primary Examiner*—Tamara L. Graysay
*Assistant Examiner*—Chong H. Kim
*Attorney, Agent, or Firm*—Hovey,Williams, Timmons & Collins

[57] ABSTRACT

A conduit guide fitting is provided which economically permits mounting a Bowden cable to a mounting bar of a lawn mower or the like. The conduit guide fitting includes a receiver adapted to receive the sheath of the Bowden cable therein and allows the control cable to pass through the receiver for connection to a shiftable control. A projection extends at an oblique angle to the fitting and is adapted to fit in a hole in the mounting bar so as to both hold the cable in position and permit pivoting of the receiver as the control is shifted.

9 Claims, 1 Drawing Sheet

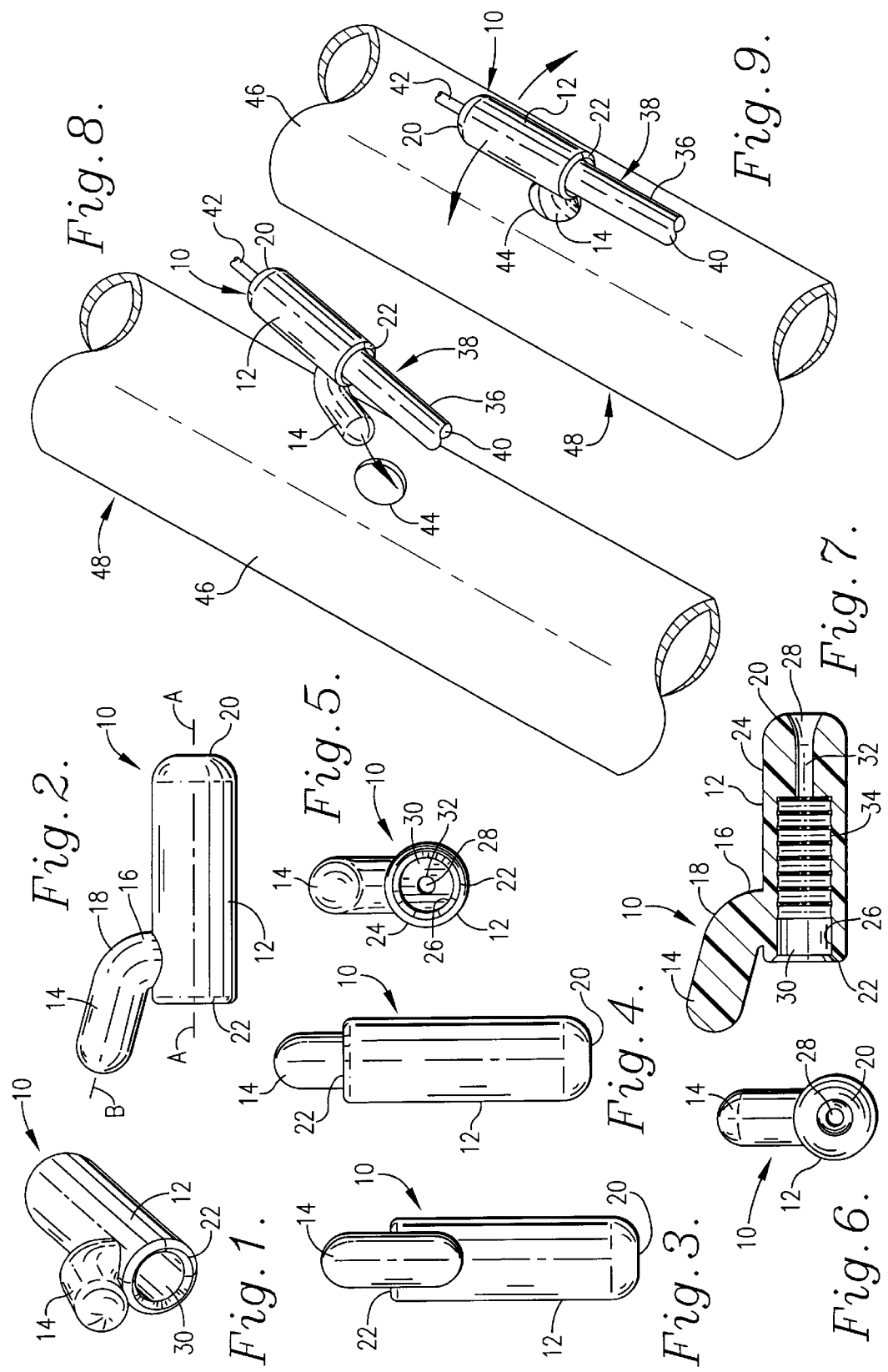

CONDUIT GUIDE FITTING

BACKGROUND OF THE INVENTION

1. Field of the Invention

This invention is concerned with a conduit guide fitting for attaching a Bowden cable to a mounting bar to control a piece of equipment such as a lawn mower. More particularly, it is concerned with a guide fitting which may be attached to the mounting bar without the necessity of tools and permits limited pivoting movement of the fitting to provide for prolonged useful life of the guide fitting and the Bowden cable.

2. Description of the Prior Art

As is well known to consumers and users of a variety of pieces of equipment such as lawn mowers, controls for the equipment are often located at a distance from the mechanism to be operated for purposes of convenience and safety. Control cables are used to connect a control such as a control lever to the mechanism, such as an engine brake, ground drive control, or throttle. In a walk-behind lawn mower, for instance, the operator grasps a handle and is provided with control levers for operating the carburetor throttle, ground drive shift mechanism, engine or blade brake, or other actuatable mechanisms. Such controls and their positioning in conjunction with a Bowden cable assembly are shown, for example, in U.S. Pat. No. 5,467,583, the disclosure of which is incorporated herein by reference.

One problem associated with these devices is the need to attractively and economically mount the cable to the equipment. Cable ties and similar articles have been used, but detract from the visual acceptance of the article. Moreover, attachment of cable ties or other fittings may involve additional labor costs which often do not directly contribute to the operating capability of the equipment or are not durable in use. Metal clamps, such as shown in U.S. Pat. No. 5,467,583, require use of a threaded fastener. Another type of support for a Bowden cable assembly is shown, for example, in U.S. Pat. No. 5,553,822 entitled Support Means for Conduit, but is best employed remotely from the control at the lower end of the cable.

Accordingly, there has developed a need for a means of easily, attractively and economically mounting the control cable to a piece of equipment in a way which is durable and does not detract from the usefulness of the equipment, and which readily aligns the control cable with the control during actuation of the control.

SUMMARY OF THE INVENTION

These objects have largely been met by the conduit guide fitting of the present invention. That is to say, the conduit guide fitting hereof is economical to produce, does not detract ornamentally from the appearance of the equipment, is durable, and mounts quickly and without the need for tools to the equipment. Advantageously, the conduit guide fitting hereof pivots during shifting of the control lever, thereby avoiding binding of the control cable and thereby enabling smooth functioning of the control.

The conduit guide fitting hereof includes a receiver for receiving a Bowden cable therein and a projection extending at an oblique angle from the exterior of the receiver. The projection may be inserted in a hole in the mounting bar without the need for tools. While the projection is thus free to pivot in the hole, the pivoting movement is enhanced by providing a short stub surface which is oriented substantially perpendicular to the exterior surface of the receiver and the longitudinal axis of the channel. The receiver is preferably provided with an enlarged chamber which receives therein a sheath of the Bowden cable, with ridges in the chamber providing frictional engagement with the sheath. The receiver, projection and stub are preferably provided of friction-resistant synthetic resin material or equivalently coated with such material to promote pivoting during shifting of the control lever to which the cable is attached.

The conduit guide fitting may be integrally provided as a control cable assembly wherein the Bowden cable is preattached to the fitting. Furthermore, it may be provided as standard equipment as a part of a lawn mower or other device and already attached to a mounting bar of the equipment, wherein the cable assembly is oriented so that it is substantially aligned with an elongated bar and then free to pivot during shifting.

These and other features of the present invention may be readily appreciated by those skilled in the art with reference to the descriptions and drawing appended hereto.

BRIEF DESCRIPTION OF THE DRAWINGS

FIG. 1 is a perspective view of the conduit guide fitting hereof from the remote end of the receiver thereof;

FIG. 2 is a top plan view thereof in the normal orientation of use of the fitting, the bottom view being a mirror image thereof;

FIG. 3 is a right side elevational view of the fitting;

FIG. 4 is a left side elevational view thereof;

FIG. 5 is an end view thereof taken from the remote end of the fitting for receiving the sheath of the Bowden cable therein;

FIG. 6 is an end view thereof taken from the proximate end of the fitting wherein the control cable may be extended through a restricted passage for connection to a control lever or the like;

FIG. 7 is a cross-sectional view taken through the fitting and the projection to show the channel extending through the interior and the enlarged chamber thereof;

FIG. 8 is a perspective view of the fitting and the attached Bowden cable assembly showing the installation of the fitting on a mounting bar of a lawn mower or similar piece of equipment; and FIG. 9 is a perspective view of the control cable assembly including the mounting bar, fitting and Bowden cable assembly showing the ability of the installed fitting to pivot as the control cable is shifted by a control lever.

DESCRIPTION OF THE PREFERRED EMBODIMENT

Referring now to the drawing, a conduit guide fitting 10 is shown in FIGS. 1 through 7 and is preferably molded of friction-resistant synthetic resin material such as Zytel 70G-33L. The guide fitting 10 broadly includes a receiver 12 and a projection 14. A stub surface 16 spaces the proximal side of projection 14 from the receiver 12 and defines an elbow 18 at one side of the junction of the receiver 12 and the projection 14, which aids during pivoting of the conduit guide fitting 10.

The receiver is shown in greater detail in FIG. 7 and includes a proximate end 20, a remote end 22, an exterior 24 and an interior 26. The exterior 24 is substantially cylindrical. The interior 24 presents a continuous channel 28 extending therethrough along an axis A. The channel includes an enlarged chamber 30 communicating with the remote end 22 and a restricted passage 32 communicating with the proximate end 20. The enlarged chamber includes a plurality of ridges 34 on the interior which aid in frictionally engaging and retaining a Bowden cable sheath.

The projection 14 is preferably solid an integrally molded with the receiver 12. The projection is oriented along an axis B which extends from the receiver 12 at an oblique angle from axis A. Most preferably, the projection 14 includes stub surface 16, the stub surface 16 being oriented substantially perpendicular to axis A and the angle between axis A and axis B most preferably being about 15 degrees. The stub surface 16 aids the pivoting of the conduit guide fitting 10 when the guide fitting is installed.

As shown in FIGS. 8 and 9, the conduit guide fitting 10 is designed to be incorporated with a Bowden cable assembly 36 to provide a control cable 38. The Bowden cable assembly 36 includes a sheath 40 and a control cable 42 shiftably received therein. The sheath 40 is inserted into the remote end 22 of the receiver 12 for housing within the chamber 30. The free end of the control cable 42 passes through the restricted passage 32 and emerges from the proximate end 20 of the receiver 12. The projection 14 is designed to be oriented generally toward the remote end 22 and received within a hole 44 of mounting bar 46 of a lawn mower 48 or other similar equipment carrying a control device for remote operation of a throttle on a carburetor or the like.

In use, the guide fitting 10 is mounted to the lawn mower by inserting the projection 14 in to the hole 44 with the projection oriented generally downwardly to support the fitting 10, which downward direction is typically toward the remote end of the fitting 10. The guide fitting 10 is free to pivot about the stub 16 when the projection 14 is inserted, with the sheath 40 of the Bowden cable assembly 36 in substantial alignment with the mounting bar 46. When the control lever is shifted by the operator causing movement of the control cable 42, the fitting 10 is free to pivot, thereby eliminating stress on the fitting 10, mounting bar 46, or Bowden cable assembly 36.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

We claim:

1. A conduit guide fitting adapted for attachment to a Bowden cable assembly, said guide fitting comprising an integral, synthetic resin body having a receiver and a locking projection, said receiver comprising an elongated, tubular element having a pair of opposed ends and a bore therethrough and presenting a longitudinal axis, said bore including an enlarged chamber adjacent one of said ends adapted to receive a Bowden cable sheath and a restricted passageway adapted to permit passage therethrough a cable but not a Bowden cable sheath said projection comprising an elongated, generally hook shaped piece extending having a length outwardly from said tubular element and with the majority of the length of the hook shaped piece comprising a shank oriented at an oblique angle relative to said longitudinal axis, said shank diverging from said tubular element along the length of the shank.

2. A conduit guide fitting as set forth in claim 1, wherein said projection includes a stub surface projecting angularly to said receiver.

3. A conduit guide fitting as set forth in claim 2, wherein said stub surface extends substantially perpendicular to said receiver and defines an elbow with said projection oriented generally toward said remote end.

4. A conduit guide fitting as set forth in claim 1, wherein said enlarged chamber includes a plurality of circumferentially oriented ridges thereon.

5. A control cable assembly as set forth in claim 1, wherein said tubular element and locking projection are provided of synthetic resin material.

6. A control cable assembly as set forth in claim 5, wherein said channel includes an enlarged chamber communicating with said remote end for receiving said sheath therein and a relatively more restricted passage communicating with said proximate end and sized for permitting passage of said control cable therethrough.

7. A control cable assembly as set forth in claim 6, wherein said enlarged chamber includes a plurality of circumferentially oriented ridges thereon in engagement with said sheath for inhibiting removal of said sheath from said chamber.

8. A control cable assembly, comprising:
    a mounting bar having a hole therein, said hole having a diameter;
    a guide fitting including an elongated tubular element defining therein a channel and a locking projection, said projection having an elbow section extending laterally from said element and an elongated shank supported by said elbow section,
    said projection inserted into said hole with said elbow section proximal to said hole and said shank extending generally along the length of said bar,
    said elbow portion being sized relative to said hole for free pivoting movement of the fitting within said hole during use of said assembly; and
    a Bowden cable having a sheath and a control cable shiftably received within said sheath;
    an end of said sheath of said Bowden cable received within said guide fitting with said control cable extending through said channel and shiftable relative to said sheath and guide fitting.

9. A control cable assembly as set forth in claim 8, wherein said Bowden cable assembly is substantially aligned with said mounting bar.

* * * * *